(12) United States Patent
Bonde

(10) Patent No.: US 10,543,948 B2
(45) Date of Patent: Jan. 28, 2020

(54) FIXTURE FOR USE WITH A MEDICAL DEVICE LABEL PRINTING SYSTEM

(71) Applicant: BOSTON SCIENTIFIC SCIMED, INC., Maple Grove, MN (US)

(72) Inventor: Michael Jeffery Bonde, Buffalo, MN (US)

(73) Assignee: BOSTON SCIENTIFIC SCIMED, INC., Maple Grove, MN (US)

(*) Notice: Subject to any disclaimer, the term of this patent is extended or adjusted under 35 U.S.C. 154(b) by 0 days.

(21) Appl. No.: 15/944,342

(22) Filed: Apr. 3, 2018

(65) Prior Publication Data

US 2018/0290782 A1  Oct. 11, 2018

Related U.S. Application Data

(60) Provisional application No. 62/481,999, filed on Apr. 5, 2017.

(51) Int. Cl.
*B32B 43/00* (2006.01)
*B65C 9/46* (2006.01)
(Continued)

(52) U.S. Cl.
CPC ............... *B65C 9/46* (2013.01); *B41M 3/00* (2013.01); *B65C 9/0006* (2013.01); *H04N 1/32128* (2013.01); *B32B 38/10* (2013.01); *B32B 43/006* (2013.01); *B65C 2009/0093* (2013.01); *B65C 2009/404* (2013.01); *Y10T 156/1168* (2015.01); *Y10T 156/1195* (2015.01); *Y10T 156/1978* (2015.01); *Y10T 156/1994* (2015.01)

(58) Field of Classification Search
CPC . B32B 38/10; B32B 43/006; Y10T 156/1168; Y10T 156/1195; Y10T 156/1978; Y10T 156/1994
USPC ................................. 156/714, 719, 764, 767
See application file for complete search history.

(56) References Cited

U.S. PATENT DOCUMENTS 5,071,030 A    12/1991  Marcusen
5,868,893 A *  2/1999  Kipper .................. B65C 11/004
                                                    156/277
(Continued)

FOREIGN PATENT DOCUMENTS

EP         2957513 A1    12/2015

*Primary Examiner* — Mark A Osele
*Assistant Examiner* — Nickolas R Harm
(74) *Attorney, Agent, or Firm* — Seager, Tufte & Wickhem, LLP

(57) ABSTRACT

Fixtures for use with medical device label printing systems are disclosed. An example fixture may include a housing designed to be coupled to a printing device. The housing may have an input region for receiving a media (e.g., that may include a backing portion and a label portion) and a return region. A separating member may be disposed within the housing. The separating member may be designed for separating the label portion from the backing portion. The separating member may be designed to shift between a first configuration where the separating member engages the media in order to separate the label portion from the backing portion and a second configuration where the separating member is positioned away from engagement with the media. The fixture may also include an actuator for shifting the separating member between the first configuration and the second configuration.

14 Claims, 7 Drawing Sheets

(51) Int. Cl.
  B65C 9/00   (2006.01)
  B41M 3/00   (2006.01)
  H04N 1/32   (2006.01)
  B32B 38/10  (2006.01)
  B65C 9/40   (2006.01)

(56) References Cited

U.S. PATENT DOCUMENTS

| | | | |
|---|---|---|---|
| 7,674,055 B2* | 3/2010 | Hiroike | B41J 3/4075 |
| | | | 400/586 |
| 8,061,403 B2* | 11/2011 | Tharp | B65C 11/0215 |
| | | | 156/247 |
| 2002/0062898 A1 | 5/2002 | Austin et al. | |
| 2004/0079490 A1* | 4/2004 | Ito | B41J 3/4075 |
| | | | 156/764 |
| 2015/0367623 A1* | 12/2015 | Tokuda | B65C 9/0006 |
| | | | 156/702 |

* cited by examiner

FIXTURE FOR USE WITH A MEDICAL DEVICE LABEL PRINTING SYSTEM

CROSS-REFERENCE TO RELATED APPLICATIONS

This application claims the benefit of priority under 35 U.S.C. § 119 to U.S. Provisional Application Ser. No. 62/481,999, filed Apr. 5, 2017, the entirety of which is incorporated herein by reference.

TECHNICAL FIELD

The present disclosure pertains to medical devices, and methods for manufacturing medical devices. More particularly, the present disclosure pertains to a fixture for use with a medical device label printing system.

BACKGROUND

A wide variety of medical devices have been developed for medical use, for example, intravascular use. Some of these devices include guidewires, catheters, and the like. These devices are manufactured and packaged by any one of a variety of different methods and/or systems. This may include the printing of a suitable label for the medical device/package using a packaging and/or label printing system. Of the known medical device packaging and/or label printing systems, each has certain advantages and disadvantages. There is an ongoing need to provide alternative medical devices packaging and/or label printing systems.

BRIEF SUMMARY

This disclosure provides design, material, manufacturing method, and use alternatives for medical devices including medical device packaging and/or label printing systems. A fixture for use with a medical device label printing system is disclosed. The fixture comprises: a housing designed to be coupled to a printing device, the housing having an input region for receiving a media from the printing device and a return region for sending at least a portion of the media to a scrapping area; wherein the media includes a backing portion and label portion; one or more rollers disposed within the housing for transporting the media through the housing; a separating member disposed within the housing, the separating member being designed for separating the label portion from the backing portion; wherein the separating member is designed to shift between a first configuration where the separating member engages the media in order to separate the label portion from the backing portion and a second configuration where the separating member is positioned away from engagement with the media; and an actuator for shifting the separating member between the first configuration and the second configuration.

Alternatively or additionally to any of the embodiments above, the scrapping area is a region of the printing device.

Alternatively or additionally to any of the embodiments above, the actuator includes a handle for shifting the separating member between the first configuration and the second configuration.

Alternatively or additionally to any of the embodiments above, further comprising a spring coupled to the handle for biasing the separating member in the first configuration.

Alternatively or additionally to any of the embodiments above, further comprising a guiding member disposed adjacent to the separating member.

Alternatively or additionally to any of the embodiments above, further comprising a scanning device, an encoder, and a processing device, and wherein the actuator includes a motor coupled to the separating member that shifts the separating member into either the first configuration or the second configuration based on information from at least one of the scanning device, the encoder, and the processing device.

Alternatively or additionally to any of the embodiments above, further comprising a scanning member disposed within the housing.

Alternatively or additionally to any of the embodiments above, further comprising an encoder disposed within the housing.

Alternatively or additionally to any of the embodiments above, further comprising at least one of a marking device, a defacing device, and a cutting device disposed within the housing.

Alternatively or additionally to any of the embodiments above, further comprising a scanning device disposed within the housing, an encoder disposed within the housing, a processing device coupled to the housing, and a display coupled to the processing device.

A fixture for use with a medical device label printing system is disclosed. The fixture comprises: a housing designed to be attached to a printing device, the housing having an input region for receiving a media from the printing device, a scanning device for scanning the media, and a return region for sending at least a portion of the media back to the printing device; wherein the media includes a backing portion and label portion; a separating member disposed within the housing, the separating member being designed for separating the label portion from the backing portion; wherein the separating member is designed to shift between a first configuration where the separating member engages the media in order to separate the label portion from the backing portion and a second configuration where the separating member is positioned away from engagement with the media; and an actuator for shifting the separating member between the first configuration and the second configuration.

Alternatively or additionally to any of the embodiments above, the actuator includes a handle for shifting the separating member between the first configuration and the second configuration.

Alternatively or additionally to any of the embodiments above, further comprising a spring coupled to the handle for biasing the separating member in the first configuration.

Alternatively or additionally to any of the embodiments above, further comprising a guiding member disposed adjacent to the separating member.

Alternatively or additionally to any of the embodiments above, the actuator includes a motor coupled to the separating member that shifts the separating member into either the first configuration or the second configuration based on information from the scanning device.

Alternatively or additionally to any of the embodiments above, further comprising an encoder disposed within the housing.

Alternatively or additionally to any of the embodiments above, further comprising at least one of a marking device, a defacing device, and a cutting device disposed within the housing.

A method for quality assurance of printed medical device labels is disclosed. The method comprises: attaching a fixture to a printing device, the fixture comprising: a housing having an input region for receiving a media from the printing device, a scanning device for scanning the media, an encoder, and a return region for sending at least a portion of the media back to the printing device, wherein the media includes a backing portion and label portion, a separating member disposed within the housing, the separating member being designed for separating the label portion from the backing portion, wherein the separating member is designed to shift between a first configuration where the separating member engages the media in order to separate the label portion from the backing portion and a second configuration where the separating member is positioned away from engagement with the media, and an actuator for shifting the separating member between the first configuration and the second configuration; positioning the separating member in the first configuration; advancing the media from the printing device into the housing; scanning the media; and shifting the separating member from the first configuration to the second configuration.

Alternatively or additionally to any of the embodiments above, further comprising adding location data to a scanned image from an encoding device disposed within the housing; and scanning the medias produces the scanned image.

Alternatively or additionally to any of the embodiments above, further comprising shifting the separating member from the second configuration to the first configuration.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which.

Figure 1:
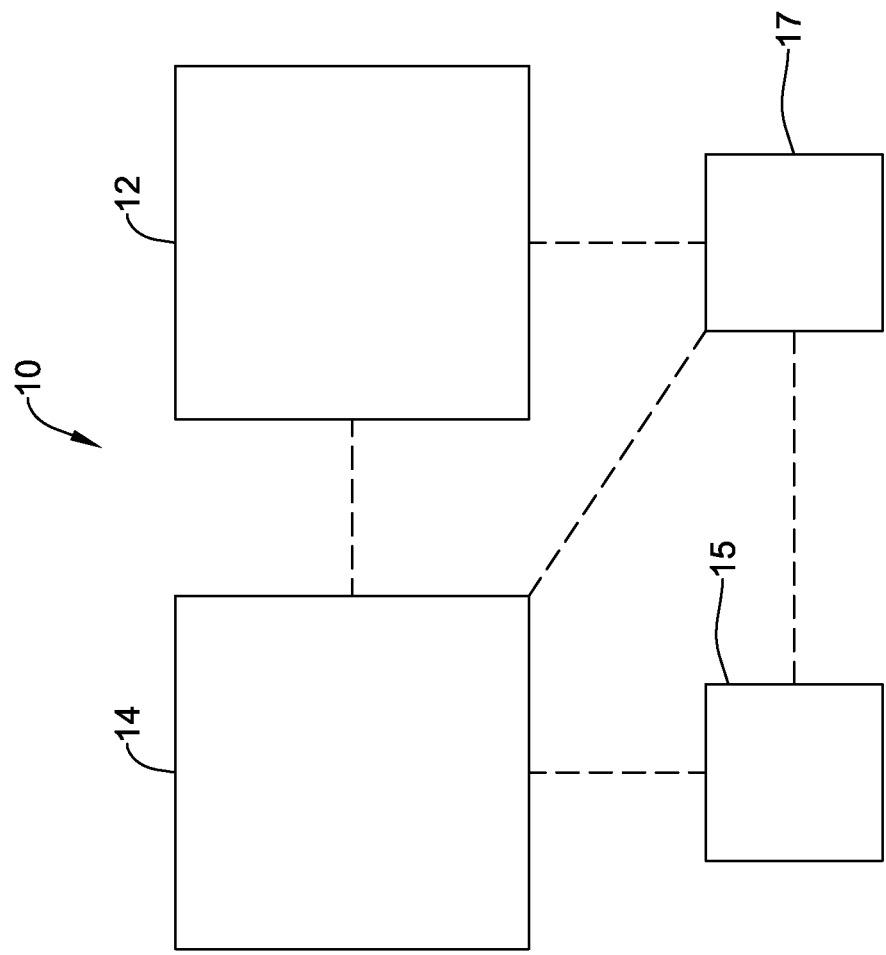
FIG. 1 is a component schematic of an example medical device label printing system.

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the invention.

Prior to sale and distribution of medical devices, manufactures typically package medical devices in a suitable package. The packages are labeled to provide identification information for the medical device and other relevant information. Printing devices are used to print labels for the medical device packaging. In some instances, it may be desirable for a quality assurance system to be utilized to help determine whether any printing errors have occurred or otherwise to reduce the likelihood that a label affixed to a medical device package is defective. Disclosed herein are fixtures that can be used with medical device label printing systems. The fixtures may include a quality assurance system to help determine whether or not printing errors may have occurred. In addition, the fixtures may include features that help to dispense labels that are considered suitable for use with medical device packaging and scrap labels that are not considered suitable for use with medical device packaging.

FIG. 1 schematically illustrates an example medical device label printing system 10. The system 10 may include a printing device 12 and a fixture 14 coupled to the printing device 12. The printing device 12 may be a suitable printer (e.g., ink jet, laser, etc.) capable of printing labels for medical device packaging. In some instance, the fixture 14 can be secured to the printing device 12, for example, by a mechanical connection. In other instances, the fixture 14 can be placed in contact with or adjacent to the printing device 12. In some instances, the fixture 14 may also be coupled to a display device 15. The display device 15 may be capable of displaying images of the printed labels coming off of the printing device 12 and/or through the processing device 17 and these images may be used to help assess/assure the quality of the printed labels. In some instances, the printing device 12, the fixture 14, and/or the display device 15 may also be coupled to a processing device 17. The processing device 17 may be capable of collecting and/or interpreting data from the system 10 and providing control instructions to the system 10.

Figure 2:
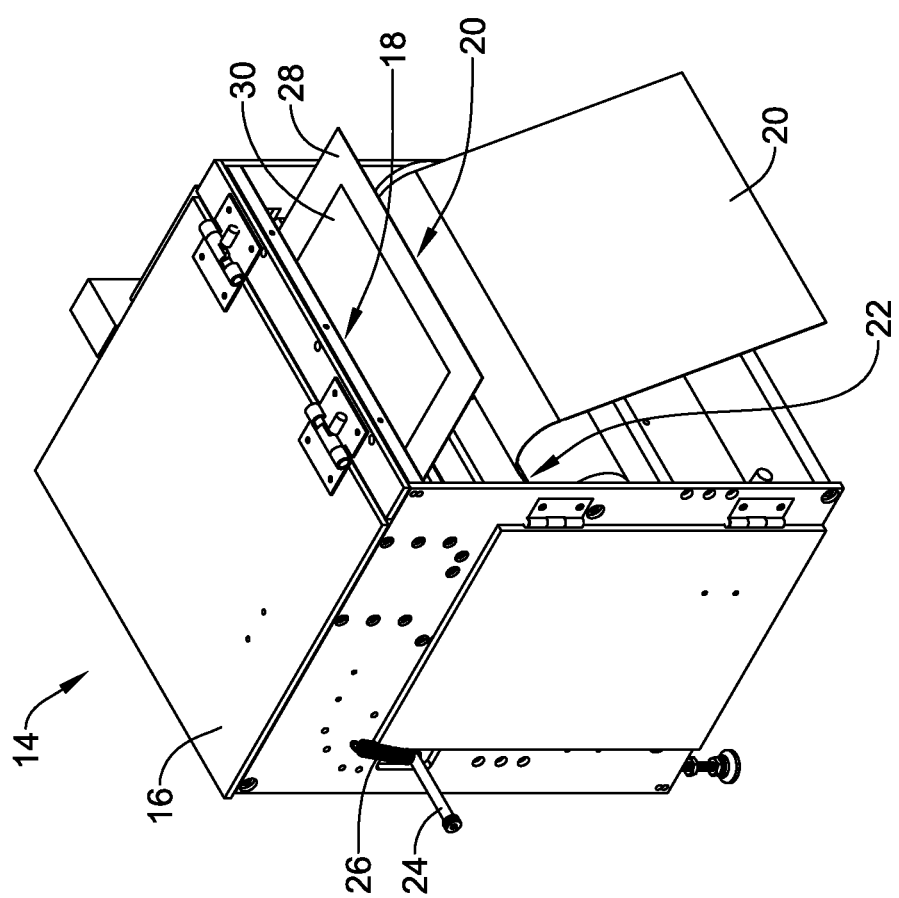
FIG. 2 is a perspective view of an example fixture for use with a medical device label printing system.

FIG. 2 is a perspective view of the fixture 14. Here it can be seen that the fixture 14 includes an enclosure or housing 16. The housing 16 may include an input region 18 for receiving a media 20 from the printing device 12. In some instances, the input region 18 may take the form of an opening and/or conveyor that allow for passage of the media 20 into the housing. The housing 16 may also include an outlet or return region 22. The return region 22 may be also be coupled to the printing device 12 so as to send at least a portion of the media 20 back to the printing device 12 (e.g., a scrapping device or region of the printing device 12), a suitable scrapping device, or the like.

Figure 3:
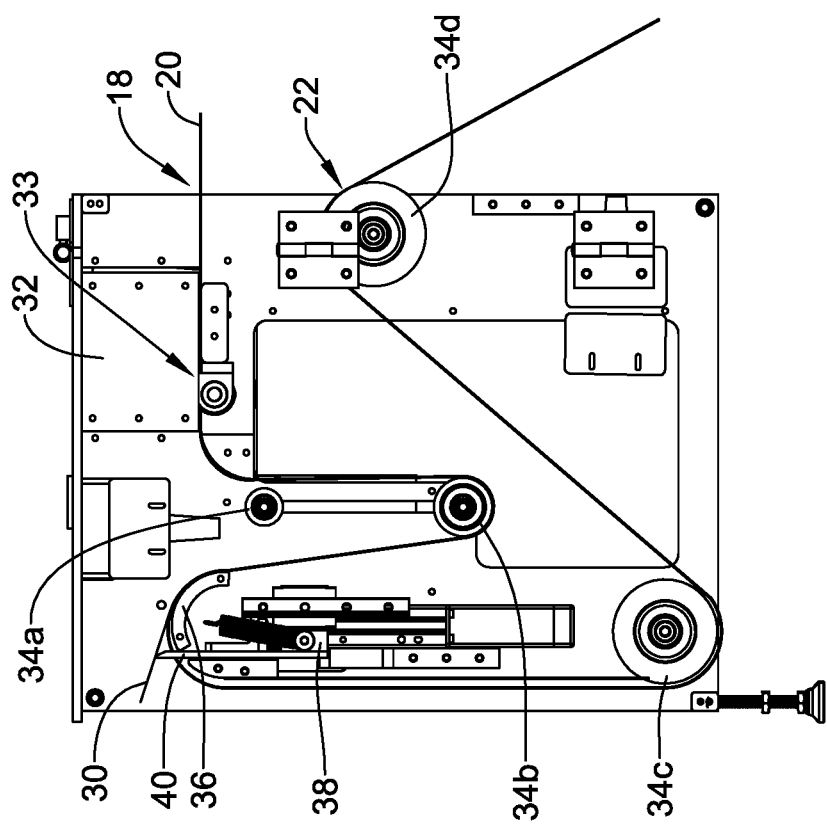
FIG. 3 is a partially cut away side view of an example fixture.

The fixture 14 may include an actuator 24. In this example, the actuator 24 takes the form of a handle. The handle 24 may be connected to a separating member (e.g., a separating member 38 as shown in FIG. 3) and the handle 24 can be moved between a first or "up" position and a second or "down" position. Shifting the handle 24 between the first and second positions may also shift the separating member 38 between a first configuration where the separating member 38 engages the media 20 in order to separate a label portion 30 of the media 20 from a backing portion 28 of the media 20 and a second configuration where the separating member 38 is positioned away from engagement with the media 20. A spring 26 may be coupled to the handle 24. In some instances, the spring 26 may bias the handle 24 in either the up position or the down position. For example, the spring 26 may bias the handle 24 in the up position.

Some of the other structural features of the fixture 14 are shown in FIG. 3. For example, a scanning device 32 may be disposed within the housing 16. In general, the scanning device 32 may be designed to scan the media 20 and generate a digital image. An encoding roller or encoder 33 may also be disposed within the housing 16 and the encoder 33 may encode the digital image and/or send location data, along with data from the scanning device 32, to the processing device 17. In some instances, the encoder 33 may send the location data to another device such as the display device 15.

In addition to the encoder 33 (which may take the form of an encoder roller), a plurality of rollers such as rollers 34a, 34b, 34c, and 34d may be disposed within the housing 16. The arrangement, number, sizing, etc. of the rollers 34a, 34b, 34c, and 34d may vary. In at least some instances, the rollers 34a, 34b, 34c, and 34d help to guide the media 20 through the fixture 14.

Figure 4:
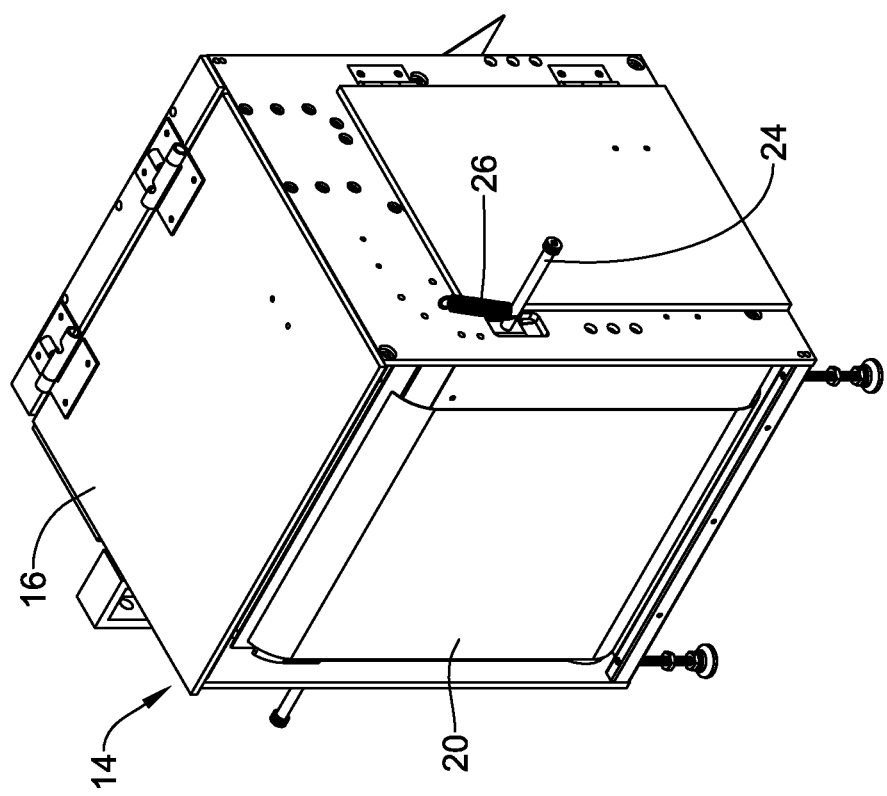
FIG. 4 is a perspective view of an example fixture.
Figure 5:
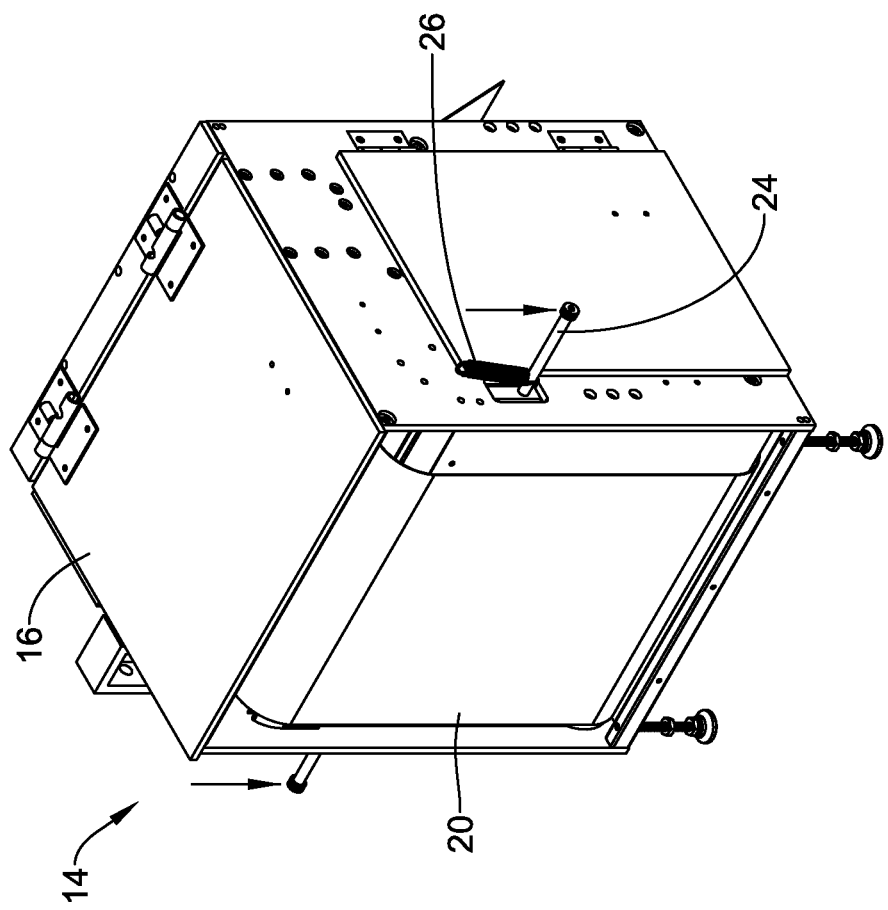
FIG. 5 is a perspective view of an example fixture.
Figure 6:
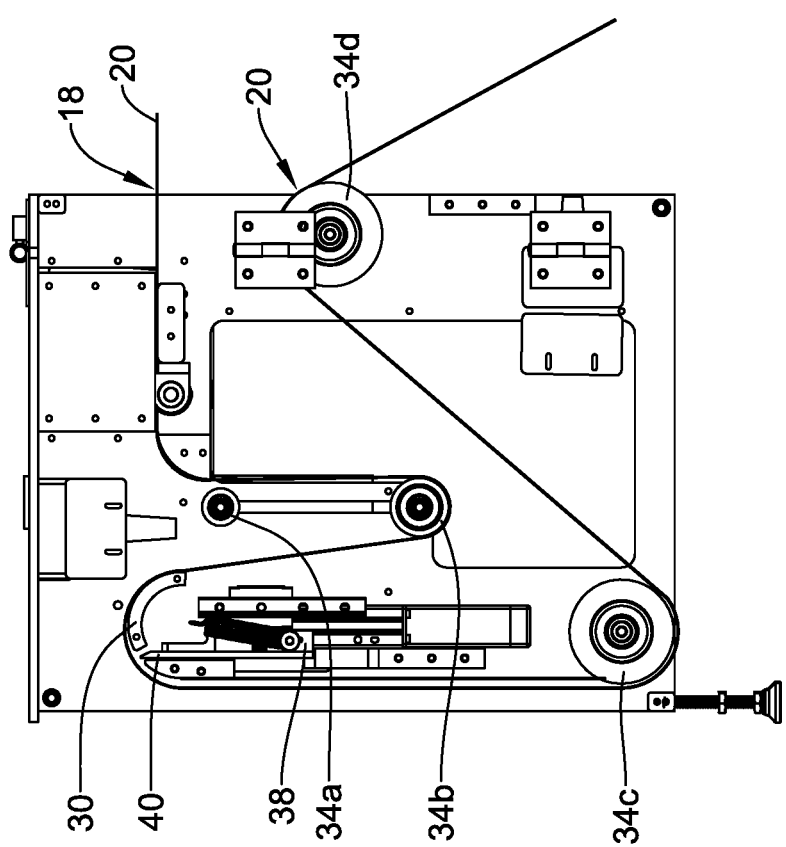
FIG. 6 is a partially cut away side view of an example fixture.

In some instance, a guiding member 36 may be disposed within the housing 16. As illustrated in FIG. 3, the guiding member 36 is a curved guiding member, but embodiments are not so limited. The curved guiding member 36 may be designed so that the media 20 can pass over the surface of the curved guiding member 36 and, thus, the media 20 can take on a curved configuration so that the separating member 38 can separate the label portion 30 from the backing portion 28. For example, the separating member 38 may include a separating bar 40 that can extend upward relative to the curved guiding member 36 so that when the media 20 engages the separating bar 40 of the separating member 38, the label portion 30 separates from the backing portion 28. In at least some instances, separating member 38 (and/or the separating bar 40) may be in the first configuration (e.g., as shown in FIG. 3) when the handle 24 is in the up position as shown in FIG. 4. When the handle 24 is shifted to down position as shown in FIG. 5, the separating member 38 shifts to the second configuration where the separating member 38 and/or the separating bar 40 move away from and out of engagement with the media 20 as shown in FIG. 6.

The fixture 14 may include a number of additional components and/or features. For example, the fixture 14 may include a cutting device that is designed to cut or otherwise destroy a portion of the media 20 (e.g., a label portion 30 thereof) that is not considered to be suitable for use. In some of these and in other instances, the fixture 14 may include a marking device that may be used to mark or otherwise deface the media 20 (e.g., a label portion 30 thereof) that is not considered suitable for use.

In at least some instances, the fixture 14 may be actuated manually or actuation may be automated as described herein. For example, the media 20 may enter the fixture 14 (via the input region 18) where the quality of the media 20 can be assessed. This may include scanning the media 20 using the scanning device 32. The quality of the media 20 may be communicated to the user in a number of different manners. For example, a user may be alerted when the media 20 contains a label portion 30 that is not considered suitable for use. The alert may be a tone, a visual cue (e.g., a "red" light indicating a label portion 30 is not suitable for use), or the like. In some instances, a user may access information pertaining to the media 20 (e.g., scanned images) on the display device 15 and the user may assess the quality of a given label. When alerted or otherwise a user decides that an assessed label portion 30 is not suitable for use, the user may manually shift the handle 24 to the down position (which then also shifts the separating member 38 to the second configuration) to "reject" the label portion 30. When doing so, the separating bar 40 of the separating member 38 is lowered so that the label portion 30 of a given "label" is not separated from the backing portion 28. The printing device 12 and the fixture 14 may then advance the media 20 until the next label portion 30 is assessed for quality. This may include advancing rejected portions of the media 20 through the return region 22 and, in some instances, back to the printing device 12. The process may then repeat, as desired.

Figure 7:
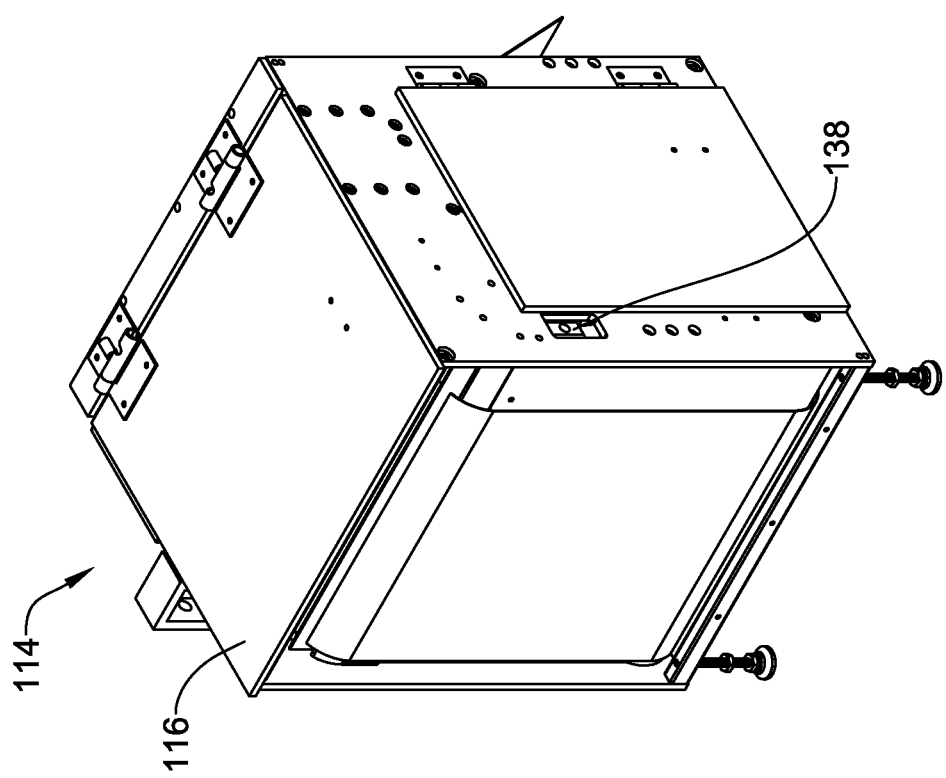
FIG. 7 is a perspective view of an example fixture.

FIG. 7 illustrates another example fixture 114 that may be similar in form and function to other fixtures disclosed herein. The fixture 114 includes a housing 116 and an actuator 138. The fixture 114 may include a number of the same internal components as the fixture 14. Unlike the fixture 14, however, the fixture 114 does not include a manually actuated handle (e.g., the handle 24) but rather includes a motor that shifts the separating member 38 between the first configuration and the second configuration. Because of this, the fixture 114 may be understood to be part of an automated system. For example, the scanning device 32 may scan the media 20. The encoder 33 may send location data to processing device 17, along with data from the scanning device 32 and then, based on the data, the processing device 17 may shift the separating member 38 to the appropriate position. For example, when the processing device 17 determines that a label portion 30 is not suitable for use, the processing device 17 may send a signal to the motor so that the separating member 38 shifts to the second configuration.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The invention's scope is, of course, defined in the language in which the appended claims are expressed.

What is claimed is:

1. A fixture for use with a medical device label printing system, the fixture comprising:
 a housing designed to be coupled to a printing device, the housing having an input region for receiving a media from the printing device and a return region for sending at least a portion of the media to a scrapping area;
 a scanning member disposed within the housing;
 wherein the media includes a backing portion and label portion;
 one or more rollers disposed within the housing for transporting the media through the housing;
 a separating member disposed within the housing, the separating member being designed for separating the label portion from the backing portion;
 wherein the separating member is designed to shift between a first configuration where the separating member engages the media in order to separate the label portion from the backing portion and a second configuration where the separating member is positioned away from engagement with the media; and
 an actuator for shifting the separating member between the first configuration and the second configuration;
 wherein the actuator includes a handle for shifting the separating member between the first configuration and the second configuration; and
 a spring coupled to the handle for biasing the separating member in the first configuration.

2. The fixture of claim 1, further comprising a guiding member disposed adjacent to the separating member.

3. The fixture of claim 1, further comprising a scanning device, an encoder, and a processing device, and wherein the actuator includes a motor coupled to the separating member that shifts the separating member into either the first configuration or the second configuration based on information from at least one of the scanning device, the encoder, and the processing device.

4. The fixture of claim 1, further comprising an encoder disposed within the housing.

5. The fixture of claim 1, further comprising at least one of a marking device, a defacing device, and a cutting device disposed within the housing.

6. The fixture of claim 1, further comprising a scanning device disposed within the housing, an encoder disposed within the housing, a processing device coupled to the housing, and a display coupled to the processing device.

7. A fixture for use with a medical device label printing system, the fixture comprising:
 a housing designed to be coupled to a printing device, the housing having an input region for receiving a media from the printing device and a return region for sending at least a portion of the media to a scrapping area;
 wherein the scrapping area is a region of the printing device;
 a scanning member disposed within the housing;
 wherein the media includes a backing portion and label portion;
 one or more rollers disposed within the housing for transporting the media through the housing;
 a separating member disposed within the housing, the separating member being designed for separating the label portion from the backing portion;
 wherein the separating member is designed to shift between a first configuration where the separating member engages the media in order to separate the label portion from the backing portion and a second configuration where the separating member is positioned away from engagement with the media; and
 an actuator for shifting the separating member between the first configuration and the second configuration.

8. A fixture for use with a medical device label printing system, the fixture comprising:
 a housing designed to be attached to a printing device, the housing having an input region for receiving a media from the printing device, a scanning device for scanning the media, and a return region for sending at least a portion of the media back to the printing device;
 wherein the media includes a backing portion and label portion;
 a separating member disposed within the housing, the separating member being designed for separating the label portion from the backing portion;
 wherein the separating member is designed to shift between a first configuration where the separating member engages the media in order to separate the label portion from the backing portion and a second configuration where the separating member is positioned away from engagement with the media; and
 an actuator for shifting the separating member between the first configuration and the second configuration.

9. The fixture of claim 8, wherein the actuator includes a handle for shifting the separating member between the first configuration and the second configuration.

10. The fixture of claim 9, further comprising a spring coupled to the handle for biasing the separating member in the first configuration.

11. The fixture of claim 8, further comprising a guiding member disposed adjacent to the separating member.

12. The fixture of claim 8, wherein the actuator includes a motor coupled to the separating member that shifts the separating member into either the first configuration or the second configuration based on information from the scanning device.

13. The fixture of claim 8, further comprising an encoder disposed within the housing.

14. The fixture of claim 8, further comprising at least one of a marking device, a defacing device, and a cutting device disposed within the housing.

* * * * *